United States Patent
Bethke (10) Patent No.: US 12,219,932 B2
(45) Date of Patent: Feb. 11, 2025

(54) SMALL DOG COMFORT ADAPTER FOR ELECTRONIC COLLARS

(71) Applicant: Daniel Bethke, Henderson, NV (US)

(72) Inventor: Daniel Bethke, Henderson, NV (US)

( * ) Notice: Subject to any disclaimer, the term of this patent is extended or adjusted under 35 U.S.C. 154(b) by 644 days.

(21) Appl. No.: 16/598,533

(22) Filed: Oct. 10, 2019

(65) Prior Publication Data

US 2021/0105977 A1   Apr. 15, 2021

(51) Int. Cl.
*A01K 27/00* (2006.01)

(52) U.S. Cl.
CPC ................ *A01K 27/009* (2013.01)

(58) Field of Classification Search
CPC .. A01K 27/001; A01K 27/009; A01K 29/005; A01K 15/021; A01K 11/008; A01K 11/006; A01K 15/029; A01K 15/022; Y10S 119/908; A01M 29/24; H05C 1/06; H05C 1/04; H05C 1/00; Y10T 24/44769; F41B 15/04; F41H 13/0018
USPC ........................... 119/858, 863, 719
See application file for complete search history.

(56) References Cited

U.S. PATENT DOCUMENTS

| | | | | |
|---|---|---|---|---|
| 5,923,254 | A * | 7/1999 | Brune | G08B 21/0288 455/100 |
| 7,685,971 | B1 * | 3/2010 | Bethke | A01K 15/021 119/719 |
| 2006/0283401 | A1 * | 12/2006 | Mainini | A01K 15/021 119/859 |
| 2011/0203529 | A1 * | 8/2011 | Mainini | A01K 15/02 119/859 |

* cited by examiner

*Primary Examiner* — Jeffrey R Larsen (74) *Attorney, Agent, or Firm* — James A. Italia; Italia IP (57) ABSTRACT

A small dog comfort adapter for electronic collars that replaces the standard post electrodes normally found on electronic training collars with wire or filamentary electrode contacts, and optionally, acorn nut electrode contacts. This design ensures proper electrical contact with the dog's skin while increasing the comfort of these collars on small dogs, which have smaller necks. The adapter can be utilized with different types of electronic training collars, such as those used to facilitate training, to curb aggressive behavior and barking, and to confine dogs by means of an invisible fence.

21 Claims, 7 Drawing Sheets

SMALL DOG COMFORT ADAPTER FOR ELECTRONIC COLLARS

BACKGROUND OF THE INVENTION

It is well known to use electronic collars as aids for training for dogs. Such collars provide a mild electric shock to the animal as a correction technique to discourage actions such as aggressive behavior and barking, or to deter a dog from leaving a designated area bounded by what commonly is known as an invisible fence. While these are the most common uses for electronic collars, this invention also applies to electronic collars having other uses. The collars can be operated manually by means of a controller in the hands of an owner or a trainer, or automatically in response to the dog barking or moving within a specified distance of the invisible fence.

Electronic training collars comprise battery powered circuitry that can supply an electric charge across two or more electrode contact elements. Typically, the electrode contact elements comprise upstanding electrically conductive posts that are about one-half inch in length and terminate in a substantially pointed end, and are spaced about one and one-fourth inches apart. The posts must be pressed against the dog's skin to such an extent as to establish an area of contact that is of sufficient size to complete the circuit. This is accomplished by suitably tightening the collar about the dog's neck. Owing to the fact that this area of contact must be established with two relatively long and narrow posts, the tightening causes some discomfort to any dog upon which the collar is fitted. However, it can cause considerable discomfort to dogs with small necks, which can result in a reluctance of small dogs to submit to having the collar placed around their necks, as well as possible skin injury or irritation.

Note that Applicant is also the inventor of U.S. Pat. No. 7,685,971, which issued on Mar. 30, 2010.

SUMMARY

The present invention provides a small dog comfort adapter for use with electronic dog collars having a housing containing means for selectively generating an electrical charge and first and second external electrode connections on a housing inner face. Mounted on an electrically non-conductive base plate are at least first and second electrodes, Each electrode may comprise an electrically conductive plate and a plurality of electrically conductive contact elements upstanding on the plate and in electrical communication with the plate. Means are provided for placing the first electrode in electrical communication with the first external electrode connection and for placing the second electrode in electrical communication with the second external electrode connection. Means also are provided for attaching the base plate, the first electrode and the second electrode to the housing inner face.

The present invention also provides a small dog comfort adapter for use with electronic dog collars having a housing containing means for selectively generating an electrical charge and first and second external electrode connections on a housing inner face. Mounted on an electrically non-conductive base plate are first and second electrodes. Each electrode may comprise an electrically conductive plate and a pair of electrically conductive acorn nuts upstanding on the plate and in electrical communication with the plate. A pair of electrically non-conductive upstanding acorn nuts mounted are on the base plate interposed between the first and second electrodes. Means are provided for placing the first electrode in electrical communication with the first external electrode connection and for placing the second electrode in electrical communication with the second external electrode connection. Means also are provided for attaching the base plate, the first electrode and the second electrode to the housing inner face. The first electrode and the second electrode may comprise wire or filamentary contact elements used in addition to or instead of contact elements provided by acorn nuts or the like, as will be further explained hereinafter. Wire or filamentary contact elements can flex to conform to body contours of the dog, especially when the dog moves or flexes its neck or back muscles.

In an embodiment, the wire or filamentary contact elements may be modified to terminate in conductive acorn nuts used in prior art devices.

BRIEF DESCRIPTION OF THE DRAWINGS

The drawings, when considered in conjunction with the following description, are presented for the purpose of facilitating an understanding of the invention sought to be protected.

DETAILED DESCRIPTION

Figure 1:
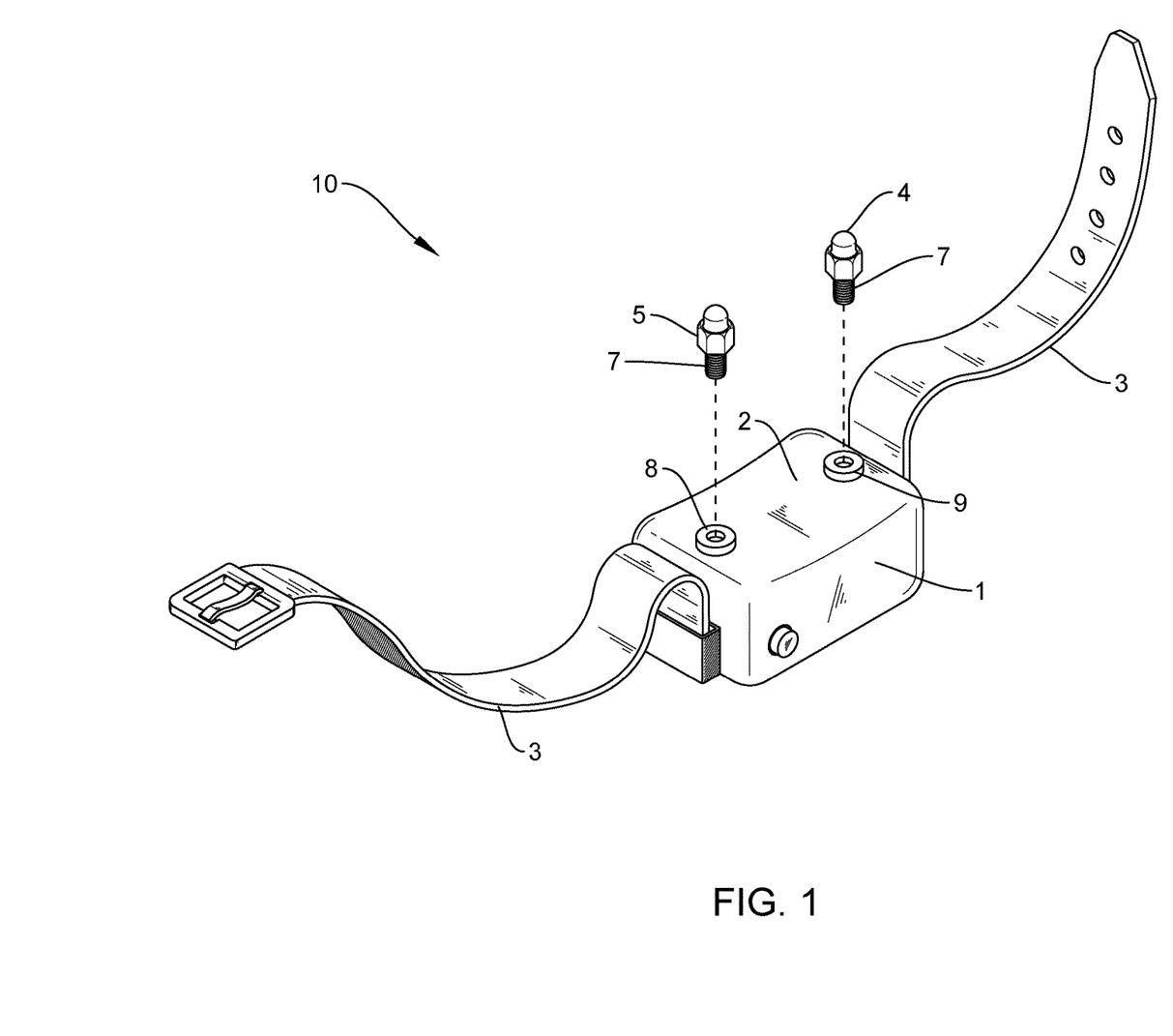
FIG. 1 is a perspective view of a prior art electronic collar showing the two electrode contact posts in an exploded view.

A typical prior art electronic dog training collar is shown in FIG. 1. It comprises a housing 1 having an inner face 2, adjustable collar straps 3, and a pair of spaced electrically conductive electrode contact elements in the form of elongated posts 4 and 5. Within housing 1 are an antenna, a battery, and the electronic circuitry that will generate an electrical charge. Posts 4 and 5 are provided with screw bases 7 which are received in threaded electrical connections 8 and 9 located on inner face 2. Threaded electrical connections 8 and 9 are of opposite electrical polarity as, it follows, are posts 4 and 5. The circuit is completed through the dog's skin, and therefore when the electronic circuitry is activated, a charge flows between posts 4 and 5 through the dog's skin, causing the dog to receive a mild electrical shock. Posts 4 and 5 typically are made of metal, are about one-half inch in length and terminate in a substantially pointed end, and are spaced apart by about one and one-fourth inches. Although posts 4 and 5 are shown in FIG. 1 as having threaded bases 7 which are received in threaded recesses 8 and 9, the opposite arrangement can be present, that is, threaded posts extending from inner surface 2 of housing 1 with threaded recesses being present at the base of each of posts 4 and 5.

Figure 2:
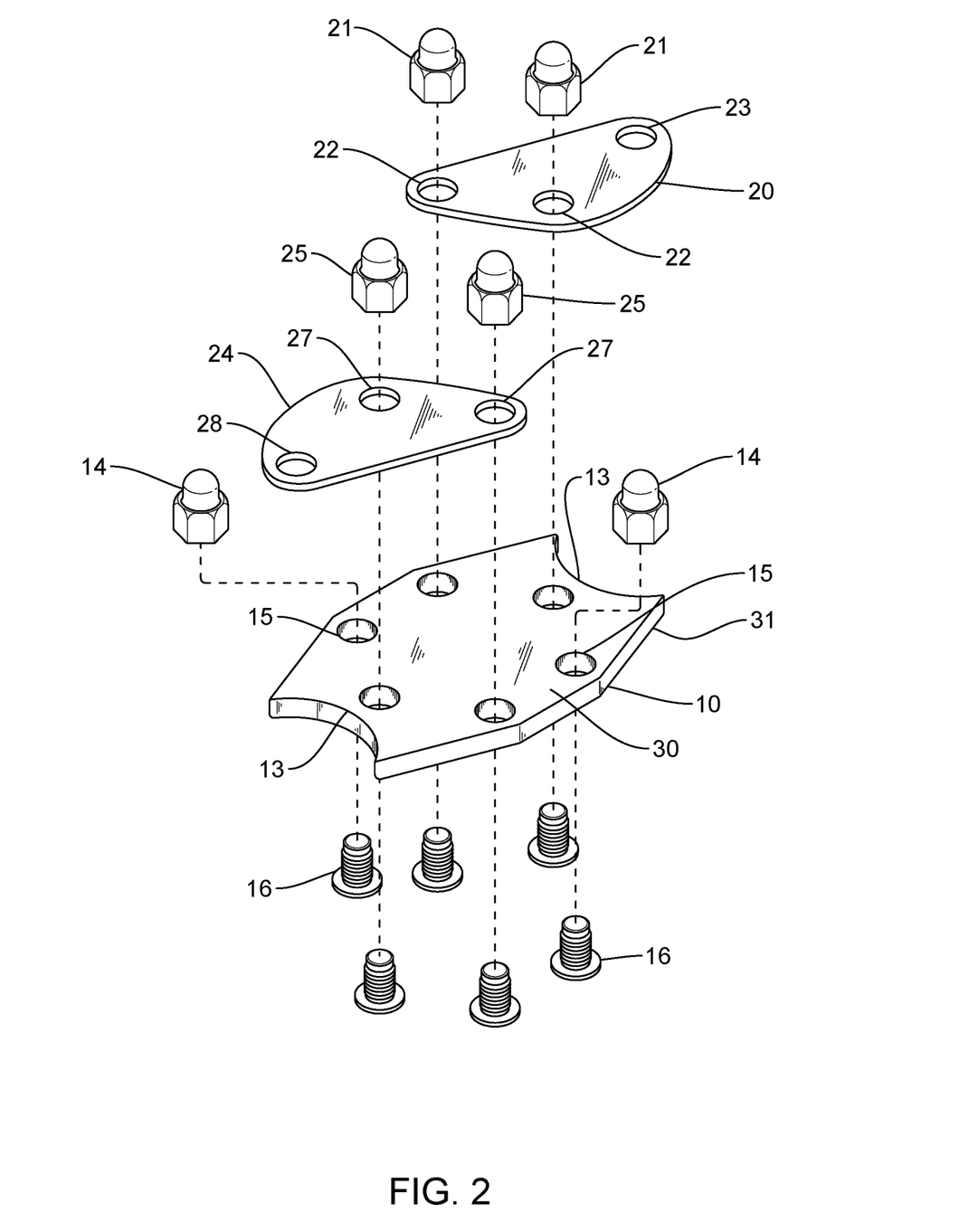
FIG. 2 is an exploded view of the components of an embodiment of the inventive small dog comfort adapter for electronic collars.

The inventive small dog comfort adapter replaces electrode posts 4 and 5 shown in FIG. 1 with an arrangement that is more comfortable for small dogs. FIG. 2 illustrates the components of the invention in an exploded view, and FIG. 3 after assembly. The adapter comprises a base plate 10 of electrically non-conductive material such as Lexan.™ Base plate 10 is shaped to fit on inner face 2 of housing 1, and includes cut-out portions 13 to accommodate threaded receptacles 8 and 9, as well as six holes 15. A pair of electrically non-conductive acorn nuts 14, of material such as nylon, are attached to the center portion of base plate 10 by means of screws 16 extending through two of the holes 15.

A first electrode 11 (FIG. 3) may comprise an electrically conductive oblong-shaped plate 20 and two electrically conductive upstanding contact elements in the form of a pair of acorn nuts 21. Two more screws 16 attach together acorn nuts 21, plate 20, and base plate 10, passing through holes 22 in plate 20 and two of the holes 15 in base plate 10. This places plate 20 in electrical communication with acorn nuts 21. Plate 20 also has another hole 23, which will be used to attach electrode 11 to housing 1. A second electrode 12 (FIG. 3) may comprise an electrically conductive oblong-shaped plate 24 and two electrically conductive upstanding contact elements in the form of acorn nuts 25. As was the case with first electrode 11, acorn nuts 25 are held in electrical communication with plate 24 by means of screws 16, which also fasten plate 24 and acorn nuts 25 to base plate 10 via holes 27 in plate 24 and two of the holes 15 in base plate 10. Plate 24 also has another hole 28, which be used to attach electrode 12 to housing 1. Plates 20 and 24 are made of a conductive material such as aluminum, and acorn nuts 21 and 25 are of conductive material such as brass. Screws 16 also are advantageously made of conductive metal. Acorn nuts 21 and 25 are of conventional construction, having a dome-like shape, and can be expected to be about one-half of the length of prior art posts 4 and 5.

Unless otherwise indicated, the terms "first" and "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

Figures 3, 4:
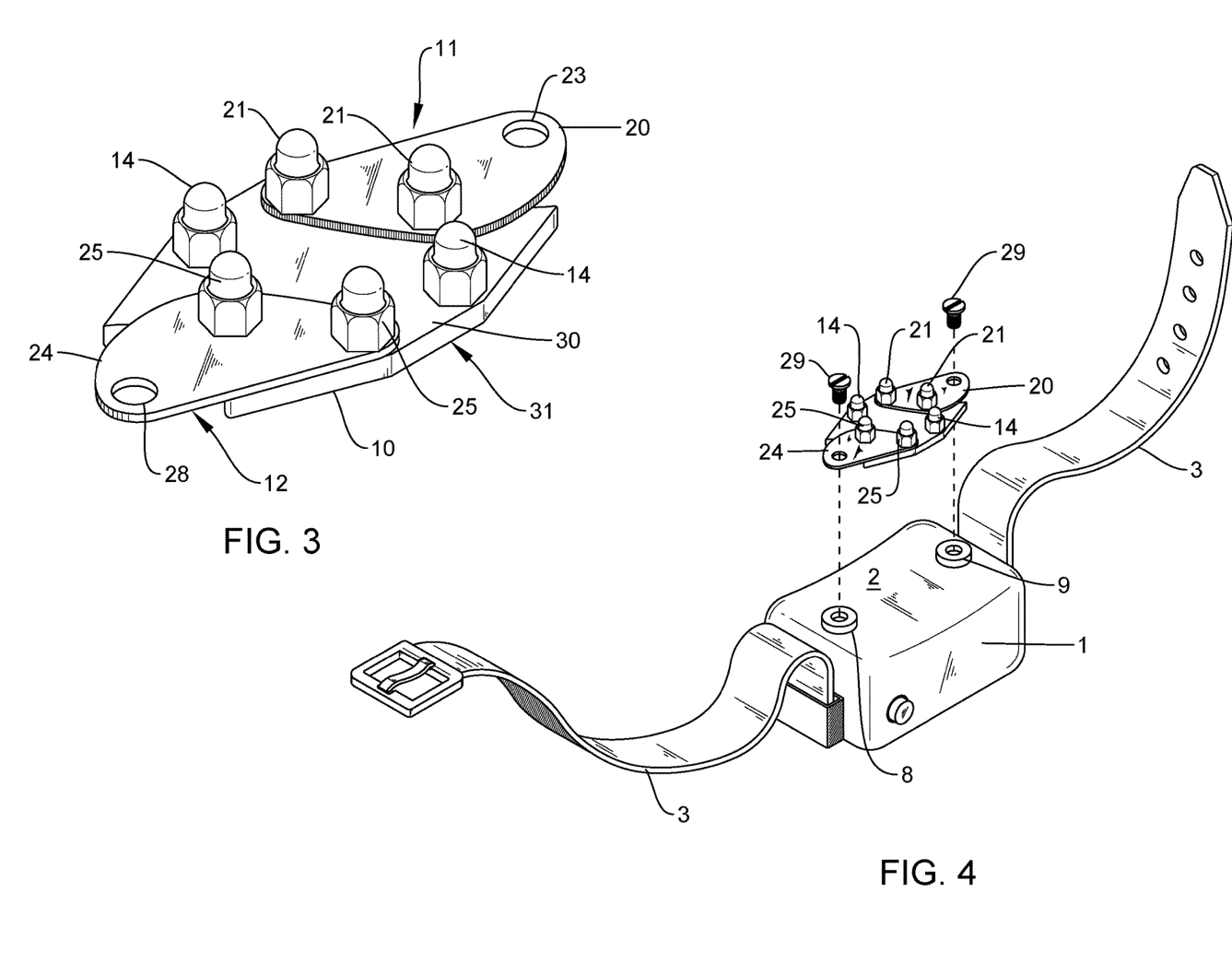
FIG. 3 is a perspective view of the assembled small dog comfort adapter.
FIG. 4 is a perspective view of an electronic dog collar with the small dog comfort adapter in an exploded view.

As is evident from FIG. 3, electrically conductive plates 20 and 24 are spaced from one another on electrically non-conductive base plate 10, with non-conductive acorn nuts 14 being interposed therebetween. As shown in FIG. 4, the inventive adapter is attached to housing 1 by a pair of electrically conductive screws 29 which pass through holes 23 and 28, respectively, in plates 20 and 24, and are screwed into threaded connections 8 and 9. This also electrically connects electrodes 11 and 12 to the electrical circuit within housing 1. While FIG. 4 illustrates a housing 1 where electrical connections 8 and 9 constitute threaded recesses, threaded posts also could be used, in which case plates 20 and 24 would be attached by nuts screwed onto the threaded posts. Furthermore, while the drawings show the plates 20 and 24 being mounted on inner surface 30 of base plate 10, they also can be mounted on the outer surface 31 of base plate 10, in which case electrically conductive metal screws 16 must be used to place acorn nuts 21 and 25 in electrical communication with plates 20 and 28.

Figure 5:
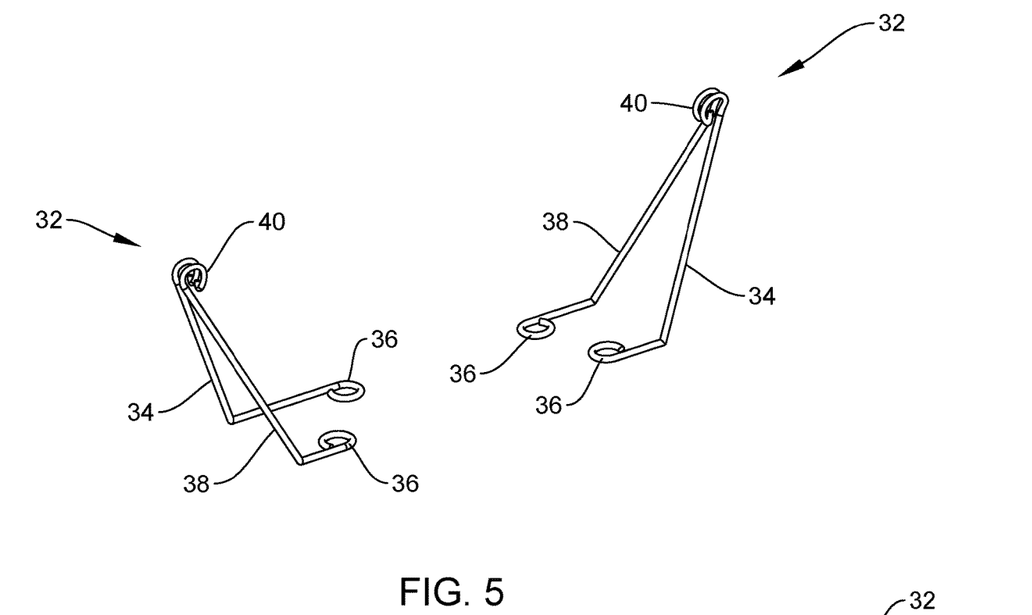
FIG. 5 is a perspective view of an alternative embodiment of electrode contact usable with the small dog comfort adapter of FIGS. 2, 3, and 4.

The novel small dog comfort adapter may be modified by substituting an electrically conductive filamentary contact element 32 of each electrode for acorn nuts 21 and 25, or alternatively, by using filamentary contact elements 32 in addition to acorn nuts 21 and 25. Contact elements 32 are shown in FIG. 5 to comprise a filament or wire frame elastically bendable under motions of a body of a dog provided with the novel small dog comfort adapter, and permanently bent to define a first leg 34 terminating in a terminal configured to retainably engage the first or second electrode 11 or 12. The terminals may for example take the form of an eyelet 36. Eyelets 36 are configured to surround and engage threaded shafts of acorn nuts 21, 25, and 37 for example. Each contact element 32 may comprise a second leg 38 generally similar to first leg 34 except for length, as shown in FIG. 5.

Contact elements 32 may be mirror image, for example, and provided in opposed pairs as seen in isolation in FIG. 5, one contact element 32 for each of first and second electrodes 11, 12.

The wire frame of each contact element 32 may be permanently bent to define a blunt contact surface 40 for contacting a skin of a dog and two terminals configured to retainably engage first and second electrodes 11, 12, respectively. Blunt contact surface 40 may comprise coiling as shown, crumpling into a ball (not shown), or other treatment to provide a blunt terminus capable of making sliding contact with the skin of the dog. The terminals configured to retainably engage electrodes 11 and 12 may comprise eyelets 36 for surrounding shafts of fasteners of first and second electrodes 11, 12. Shafts of fasteners may be threaded shafts engaging acorn nuts 21 and 25, for example, and may be separate from plates 20 and 24.

A non-conductive stabilizing plate 42 may be provided to cover and electrically separate electrodes 11 and 12. Stabilizing plate 42 may be used to provide a stable seating surface for acorn nuts 21 and 25, particularly when accommodating sandwiching of eyelets 36 between acorn nuts 21 or 25, and plates 20 or 24. Stabilizing plate 42 may span and partially cover electrodes 11 and 12, as shown in FIG. 6.

Among the reasons why the inventive adapter is more comfortable for the dog to wear than the prior art two post system are the following: The lesser height of the acorn nuts results in less intrusion into the skin on the dog's neck when the collar is tightened to the extent necessary to complete the electrical circuit when the collar is activated. The rounded ends of acorn nuts also contribute to less intrusion and provide more comfort than the upstanding posts used on the prior art devices. The presence of two electrically conductive acorn nuts rather than a single post for each electrode provides a greater area of electrical contact with the dog's skin, thus facilitating the flow of the electrical charge though the dog's skin and smoothing out the application stimulation provided by the electrical charge. The electrically non-conductive acorn nuts eliminate the large gap that would otherwise be present between the upstanding acorn nuts of the two electrodes, and the symmetrical arrangement of the six acorn nuts spreads the force applied to the dog's neck by the collar over a much larger area than the prior art system, thus increasing comfort and reducing skin irritation.

Figure 6:
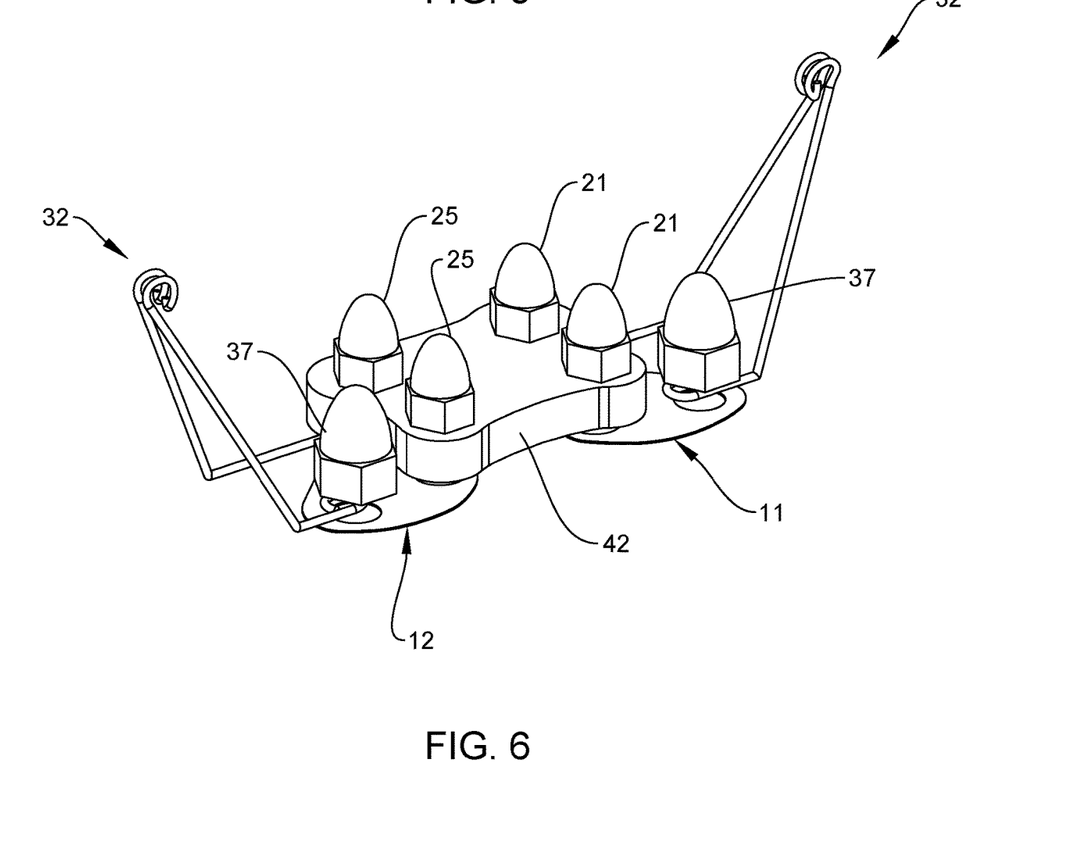
FIG. 6 is a perspective view of the alternative embodiment electrode contact operably connected to energizable terminals of the small dog comfort adapter of FIGS. 2, 3, and 4.
Figure 7:
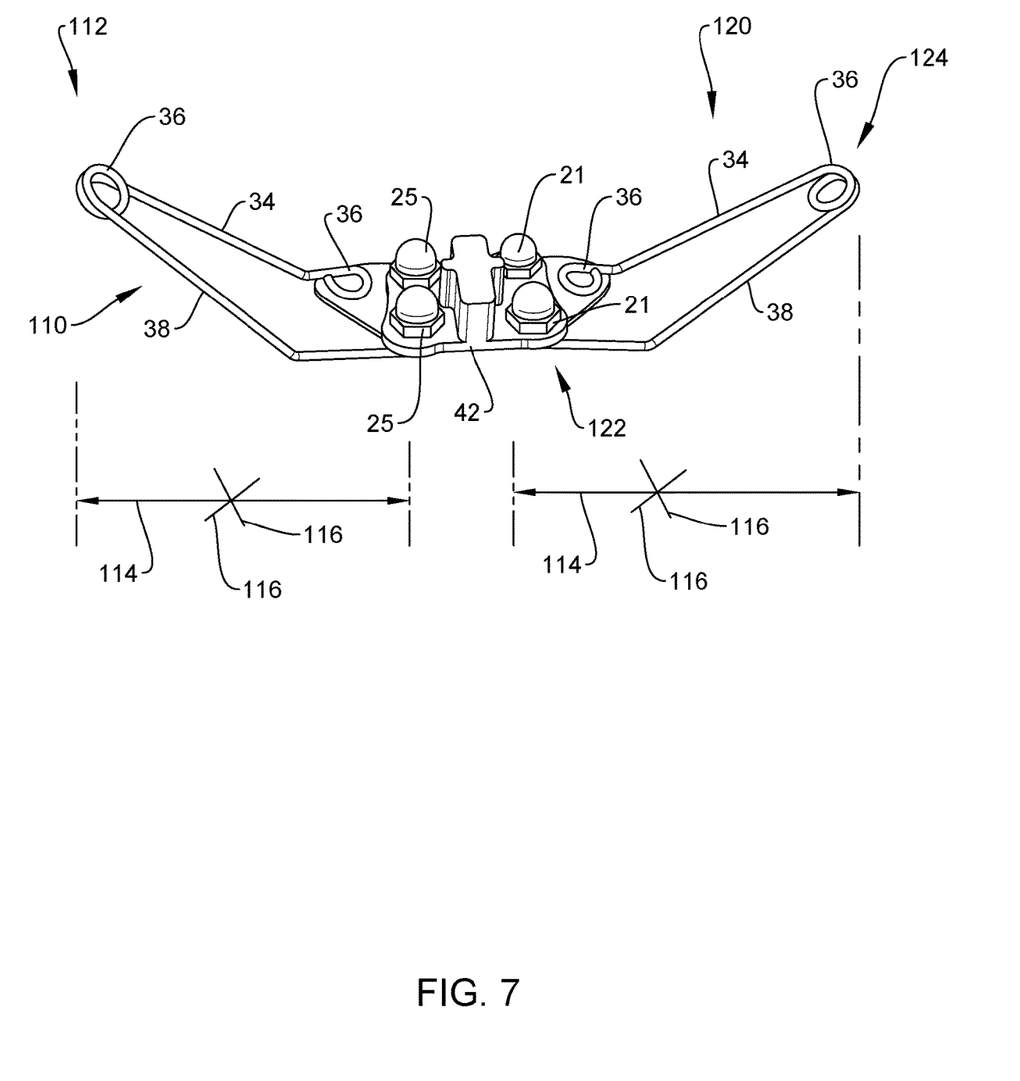
FIG. 7 is a perspective view of a component seen at the top center of FIG. 4, modified to illustrate a further alternative embodiment.
Figure 8:
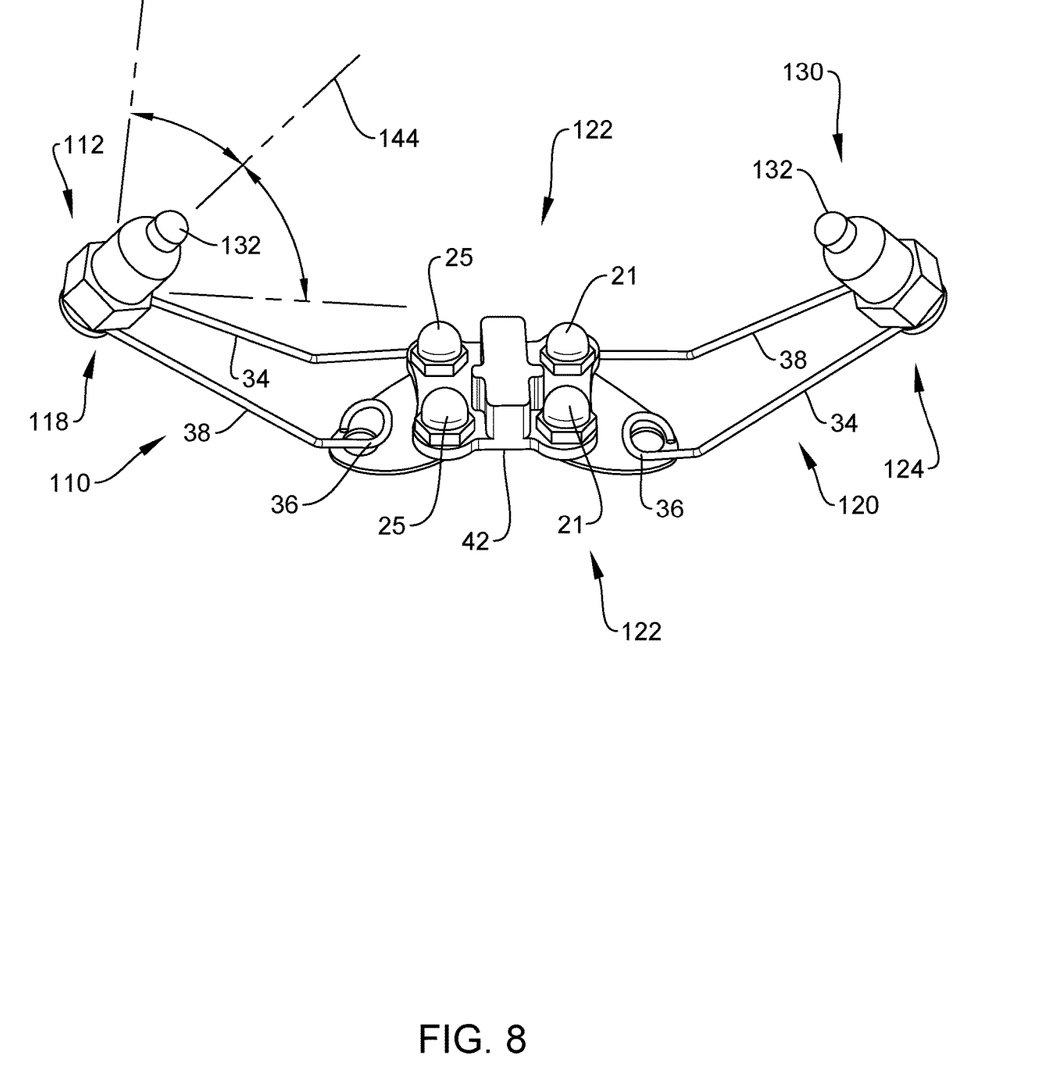
FIG. 8 is a perspective view similar to FIG. 7, but showing electrode contact elements installed thereon.
Figure 9:
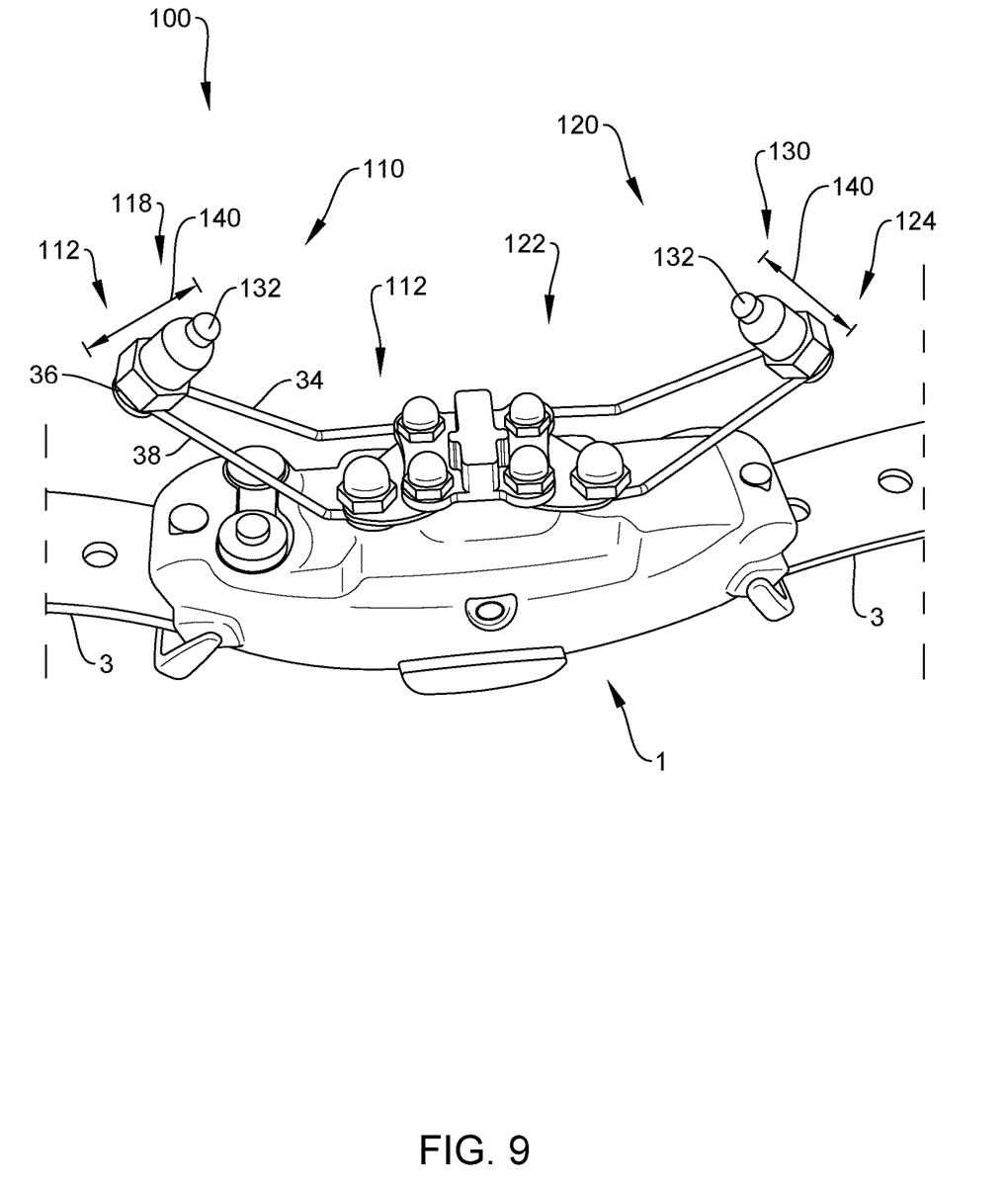
FIG. 9 is a perspective view of the electronic collar of FIG. 1, with the modification of FIGS. 7 and 8 installed thereto.

In a variation of the foregoing, it would be possible to modify contact elements 32 of FIGS. 5 and 6 to utilize conductive acorn nuts 21, 25. As seen in FIGS. 7-9, the present invention may utilize some components shown in FIG. 1, with certain modifications thereto. Retained components are identified by one or two digit reference numerals used in FIGS. 1-6. A novel electronic animal collar 100 of the type worn around a neck of an animal (not shown) and for administering electrical shocks to the animal, electronic animal collar 100 may comprise housing 1 containing means for selectively generating an electrical charge, including a first external electrode connection 8 (best seen in FIG. 1) and a second external electrode connection 9 (best seen in FIG. 1) on housing 1. Adjustable collar belt straps 3 project from housing 1, for encircling the animal, and having a closure (e.g., the buckle and corresponding hole arrangement shown in FIG. 1).

A resilient first spring arm 110 projects from housing 1 (projection may be indirect, e.g., as via plate 42). First spring arm 110 is electrically conductive and comprises a proximal end (seen as eyelet 36 in FIG. 8) in electrical communication with first external electrode connection 8 (FIG. 1). First spring arm 110 comprises an opposed distal end 112, a length 114 and transverse dimensions 116 along length 114, and a first external electrode 118 (FIG. 9) at opposed distal end 112.

A resilient second spring arm 120 projects from housing 1 (projection may be indirect, e.g., as via plate 42). Second spring arm 120 is electrically conductive and comprises a proximal end 122 in electrical communication with second external electrode connection 9 (FIG. 1). Second spring arm 120 comprises an opposed distal end 124, a length 114 and transverse dimensions 116 along length 114, and a second external electrode 130 (FIG. 9) at opposed distal end 124.

First spring arm 110 and second spring arm 120 are configured to resiliently bias first external electrode 118 and second external electrode 130 against the animal when electronic animal collar 100 is installed on the animal. First external electrode 118 and second external electrode 130 each comprise a rounded terminus 132 of transverse dimension greater than transverse dimension 116 of respective first spring arm 110 and second spring arm 128. In summary, first and second spring arms 110 and 128 may be mirror images of one another.

Rounded terminus 132 may be partially spherical, partially parabolic, or curved in any other suitable way to avoid a sharp point which could be uncomfortable to the animal.

In the embodiment of FIGS. 7-9, first spring arm 110 and second spring arm 120 primarily comprise metallic wire. Regardless of configuration, first and second spring arms 110, 120 have spring characteristics causing first and second external electrodes 118, 130 to press against the skin of the animal regardless of minor variations in collar tightness after being installed.

As seen in FIG. 7, the metallic wire of first spring arm 110 and of second spring arm 120 each form eyelet 36 configured to engage and retain respectively first external electrode 118 and second external electrode 130. Engagement may be accomplished by frictional engagement of a stud projecting from first and second external electrodes 118, 130, by being clamped to first and second external electrodes 118, 130 by a bolt (not shown), or in still other ways.

An advantage of the embodiment of FIGS. 7-9 using wire first and second spring arms 110, 120 is that first and second external electrodes 118, 130 may be removed from the conventional collar shown in FIG. 1 and readily reused after mounting at the end of first and second spring arms 110, 120 as shown. Wire construction facilitates fabrication exploiting this reuse.

In the embodiment of FIGS. 7-9, at least one of first external electrode 118 and second external electrode 130 comprises an electrically conductive acorn nut (FIGS. 8 and 9). As employed herein, an acorn nut will be understood to include at one end, a threaded hole or alternatively a threaded shaft, and a rounded or domed end (e.g., rounded terminus 132) at an opposed end. The acorn nut may be provided with treads or other friction enhancing structure to facilitate manual grasping and turning between the two opposed ends. For the purposes of the present disclosure, an acorn nut may or may not include wrench engaging surfaces typical of acorn nuts used as general hardware.

As seen in FIGS. 7-9, at least one of first spring arm 110 and second spring arm 120 projects laterally from housing 1. In the embodiment of FIGS. 7-9, housing 1 will be understood optionally to encompass a removable cover (i.e., plate 42) facilitating retention of first and second spring arms 110 and 120. In embodiments not utilizing a removable cover, spring arms 110, 120 may be coupled directly to housing 1 and/or to electrical connections 8 and 9. Embodiments eliminating plate 42 are not shown.

It will be seen from FIGS. 7-9 that first and second spring arms 110, 120 project in opposed directions, initially horizontally as seen in FIGS. 7-9. It should be noted at this point that orientational terms such as horizontal refer to the subject drawing as viewed by an observer. The drawing figures depict their subject matter in orientations of convenience or normal use, which could obviously change with changes in posture and position of the novel collar. Therefore, orientational terms must be understood to provide semantic basis for purposes of description, and do not limit the invention or its component parts in any particular way.

As called out most clearly seen in FIG. 9, first external electrode 118 and second external electrode 130 each have a length 140, with respective rounded terminus 132 at an end of length 140 of its respective first external electrode 118 or second external electrode 130. Lengths 140 of first external electrode 118 and second external electrode 130 project from their respective spring arms 110, 120 at an angle in a range of zero to forty-five degrees from perpendicular 144 (FIG. 8) relative to a length of their respective spring arms 110, 120. For the purposes of this disclosure, perpendicular 144 is a projection line or an extension of a central longitudinal axis of acorn nuts or first or second external electrodes 118 or 130 (or of corresponding terminals, where acorn nuts are not used). These geometric relationships are called out for only one acorn nut or external electrode 118 in FIG. 8, but of course, similar principles apply to the other acorn nut or external electrode 130.

These geometric relationships cause rounded terminus 132 to impinge squarely and effectively on the skin of the animal when electronic animal collar 100 is installed on the animal, regardless of variations in collar tightness, hair thickness or depth of the animal, etc.

It should be noted that first and second spring arms 110 may take configurations other than that depicted herein, such as semicircular along lengths 116. It is merely desirable that first and second electrodes 118, 130 be oriented appropriately for effective yet comfortable contact with the animal.

While the present disclosure has been described in connection with what is considered the most practical and preferred embodiments, it is understood that this disclosure is not limited to the disclosed embodiments, but is intended to cover various modifications and arrangements included within the spirit and scope of the broadest interpretation so as to encompass all such modifications and equivalent arrangements.

I claim:

1. A small dog comfort adapter for use with electronic dog collars having a housing containing means for selectively generating an electrical charge and first and second external electrode connections on a housing inner face, comprising
an electrically non-conductive base plate;
a first electrode coupled to said base plate, said first electrode comprising an electrically conductive first plate and an electrically conductive first filamentary contact element projecting from said first plate and in electrical communication with said first plate, wherein said electrically conductive first filamentary contact element is bendable under motions of a body of a dog provided with said small dog comfort adapter;
a second electrode coupled to said base plate, said second electrode comprising an electrically conductive second plate and an electrically conductive second filamentary contact element projecting from said second plate and in electrical communication with said second plate, wherein said electrically conductive second filamentary contact element is bendable under motions of a body of a dog provided with said small dog comfort adapter;
means for placing said first electrode in electrical communication with said first external electrode connection and means for placing said second electrode in electrical communication with said second external electrode connection; and
means for attaching said electrically non-conductive base plate, said first electrode and said second electrode to said housing inner face;
wherein said electrically conductive first filamentary contact element and said electrically conductive second filamentary contact element each comprise a wire frame, each wire frame comprising a first wire leg and a second wire leg.

2. The small dog comfort adapter of claim 1, wherein said first wire leg comprises a terminal eyelet designed to attach to said base plate and said second wire leg comprises a terminal eyelet designed to attach to said first plate or said second plate.

3. A small dog comfort adapter for use with electronic dog collars having a housing containing means for selectively generating an electrical charge and first and second external electrode connections on a housing inner face, comprising
an electrically non-conductive base plate;
a first electrode mounted on said base plate, said first electrode comprising an electrically conductive first plate and a plurality of electrically conductive first contact elements upstanding on said first plate and in electrical communication with said first plate and an electrically conductive first filamentary contact element projecting from said first plate and in electrical communication with said first plate, wherein said electrically conductive first filamentary contact element is bendable under motions of a body of a dog provided with said small dog comfort adapter;
a second electrode mounted on said base plate, said second electrode comprising an electrically conductive second plate spaced from said first plate and a plurality of electrically conductive second contact elements upstanding on said second plate and in electrical communication with said second plate and an electrically conductive second filamentary contact element projecting from said second plate and in electrical communication with said second plate, wherein said electrically conductive second filamentary contact element is bendable under motions of a body of a dog provided with said small dog comfort adapter;
means for placing said first electrode in electrical communication with said first external electrode connection and means for placing said second electrode in electrical communication with said second external electrode connection; and
means for attaching said base plate, said first electrode and said second electrode to said housing inner face;
wherein said electrically conductive first filamentary contact element and said electrically conductive second filamentary contact element each comprise a wire frame, each wire frame comprising a first wire leg and a second wire leg.

4. The small dog comfort adapter of claim 3 further comprising a plurality of electrically non-conductive upstanding third contact elements on said base plate interposed between said first electrode and said second electrode.

5. The small dog comfort adapter of claim 4 wherein said plurality of first contact elements and said plurality of second contact elements each comprise electrically conductive acorn nuts.

6. The small dog comfort adapter of claim 5 wherein said first and second external electrode connections on said housing inner face comprise first and second threaded recesses, and wherein said means for placing said first electrode and said second electrode in electrical communication with said first and second external electrode connections comprise electrically conductive screws in contact respectively with said first electrode and said second electrode and receivable in said first and second threaded recesses.

7. The small dog comfort adapter of claim 6 wherein said first external electrode connection and second external electrode connection on said housing inner face comprise upstanding first and second threaded posts, and wherein said means for placing said first electrode and said second electrode in electrical communication with said first and second external electrode connections comprise electrically conductive nuts in contact respectively with said first electrode and said second electrode and receivable by said first and second threaded posts.

8. The small dog comfort adapter of claim 7 further comprising a plurality of electrically non-conductive upstanding third contact elements on said base plate interposed between said first electrode and said second electrode, and wherein said first contact elements, said second contact elements and said third contact elements are arranged in a substantially circular array.

9. The small dog comfort adapter of claim 8 wherein said base plate further comprises a base plate inner face, and said first electrode and said second electrode are mounted on said base plate inner face.

10. The small dog comfort adapter of claim 9 wherein said base plate further comprises a base plate outer face, and said first electrode and said second electrode are mounted on said base plate outer face.

11. An electronic animal collar of the type worn around a neck of an animal and for administering electrical shocks to the animal, the electronic animal collar comprising
a housing containing means for selectively generating an electrical charge, including a first external electrode connection and a second external electrode connection on the housing,
belt straps projecting from the housing, the belt straps for encircling the animal and having a closure, a resilient first spring arm projecting from the housing, wherein the first spring arm is electrically conductive and comprises a proximal end in electrical communication with the first external electrode connection and an opposed distal end, a length and transverse dimensions along the length, and a first external electrode at the opposed distal end, a resilient second spring arm projecting from the housing, wherein the second spring arm is electrically conductive and comprises a proximal end in electrical communication with the second external electrode connection and an opposed distal end, a length and transverse dimensions along the length, and a second external electrode at the opposed distal end, wherein the first spring arm and the second spring arm are configured to resiliently bias the first external electrode and second external electrode against the animal when the electronic animal collar is installed on the animal, and the first external electrode and the second external electrode each comprise a rounded terminus of transverse dimension greater than the transverse dimension of the respective first spring arm and second spring arm;

wherein said first spring arm and said second spring arm each comprise a wire frame, each wire frame comprising a first wire leg and a second wire leg.

12. The electronic animal collar of claim 11, wherein the wire frames of the first spring arm and of the second spring arm form an eyelet configured to engage and retain respectively the first external electrode and the second external electrode.

13. The electronic animal collar of claim 11, wherein at least one of the first external electrode and the second external electrode comprises an electrically conductive acorn nut.

14. The electronic animal collar of claim 11, wherein at least one of the first spring arm and the second spring arm projects laterally from the housing.

15. The electronic animal collar of claim 14, wherein the first external electrode and the second external electrode
each have a length, with the respective rounded terminus at an end of the length of its respective first external electrode or second external electrode, and
the lengths of the first external electrode and the second external electrode project from their respective spring arms at an angle in a range of zero to forty-five degrees from perpendicular relative to a length of their respective spring arms.

16. The small dog comfort adapter of claim 1, wherein portions of said first wire leg and said second wire leg are symmetrically disposed to each other.

17. The small dog comfort adapter of claim 3, wherein portions of said first wire leg and the second wire leg are symmetrically disposed to each other.

18. The electronic animal collar of claim 11, wherein portions of said first wire leg and said second wire leg are symmetrically disposed to each other.

19. The small dog comfort adapter of claim 1, wherein said first wire leg and said second wire leg each have an inner portion and an outer portion with a bend therebetween, the bend forming an obtuse angle between said inner portion and said outer portion.

20. The small dog comfort adapter of claim 3, wherein said first wire leg and said second wire leg each have an inner portion and an outer portion with a bend therebetween, the bend forming an obtuse angle between said inner portion and said outer portion.

21. The electronic animal collar of claim 11, wherein said first wire leg and said second wire leg each have an inner portion and an outer portion with a bend therebetween, the bend forming an obtuse angle between said inner portion and said outer portion.

* * * * *